United States Patent Office 2,935,531
Patented May 3, 1960

2,935,531
PROCESS FOR MAKING FLUORINATED ORGANIC COMPOUNDS

Johannes Dahmlos, Haltern, Germany, assignor to WASAG-Chemie Aktiengesellschaft, Essen, Germany No Drawing. Application April 24, 1958
Serial No. 730,518

11 Claims. (Cl. 260—544)

This invention relates to a process for making fluorinated organic compounds, and more particularly to the production of organic compounds containing fluorine bonded in radical groups the central atoms of which are aliphatic carbon atoms, by means of an exchange of fluorine for chlorine.

It is well known in the art that certain halogenated organic compounds, and in particular chlorinated compounds, can be caused to undergo an exchange of fluorine for either a part or the entire chlorine contained in the halogenated compound with hydrofluoric acid or an inorganic fluoride. This halogen exchange is particularly easy to achieve in the case of carboxylic halides and aliphatic otherwise substituted or unsubstituted halogenated compounds which contain two or more halogen atoms bonded to the same carbon atom.

By aliphatic carbon atoms, I mean all carbon atoms linked to other carbon atoms in a non-aromatic manner, and preferably by a single bond.

Aliphatic carbon atoms which are particularly suited for the process according to the invention are carbon atoms having a single one of their four valencies occupied by another carbon atom.

Radical groups containing fluorine in the organic compounds produced according to the invention are, for instance, represented by the following general formulas:

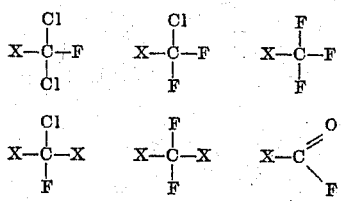

X may be hydrogen, another halogen atom, or another carbon atom of either aliphatic or aromatic character.

The known processes had to rely for their supply of fluorine exclusively on fluor spar (fluorite) as the only starting material available for the production of inorganic fluorides and hydrofluoric acid.

It is, therefore, an object of my invention to broaden the basis of fluorine sources for the halogen exchange process in the production of fluorinated organic compounds.

It is another object of my invention to provide for a process of fluorinating organic compounds by using as a fluorine source the by-products hitherto little utilized and therefore economically worthless of other industrial processes.

These objects are attained by the process according to my present invention which is based on my discovery that the halogen exchange of the chlorine atoms in organic compounds having chlorine bonded to aliphatic carbon atoms for fluorine atoms can be readily achieved by treating the organic compounds in question with fluosilicates. Sodium fluosilicate, potassium fluosilicate and barium fluosilicate are particularly suited for carrying out the process according to my invention.

My discovery makes it possible to use as a fluorine source for the fluorination of the above-mentioned organic compounds other naturally occurring fluorine-containing materials, and in particular crude phosphate minerals such as apatite and the like. These minerals are processed on a large scale industrially to obtain superphosphate, and during the production of the latter, a considerable portion of the fluorine contained in the minerals is converted to a by-product in the form of gaseous silicon tetrafluoride. The latter is absorbed in water and thus forms fluosilicic acid, which is converted by neutralization with caustic soda solution to the most readily available and least expensive sodium fluosilicate.

I have found that the reaction between the fluosilicate and the organic halogenated compound to be fluorinated must be carried out at elevated temperature, preferably at the boiling temperature of the organic compound, and where the boiling point of the latter is too low to attain under atmospheric pressure the necessary reaction temperature, which appears to be in the order of 200° C., under increased pressure, for instance, in an autoclave.

The reactions which take place when, for instance, treating carbon tetrachloride with sodium fluosilicate in an autoclave at temperatures between 250° and 300° C. are illustrative of the process of my invention and shall, therefore, be explained hereinafter in detail. The above two substances react with each other according to the summary equation:

(1) 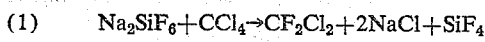 $Na_2SiF_6 + CCl_4 \rightarrow CF_2Cl_2 + 2NaCl + SiF_4$

In this equation $CF_2Cl_2$ is not to be considered a uniform substance, but a mixture of different chlorofluoro compounds having different degrees of fluorination and a summary formula

 $CF_xCl_{(4-x)}$ in which $x$ may vary from 1 to 3.

Equation 1 shows that carbon tetrachloride expels two-thirds of the fluorine available in the fluosilicate from the latter in the form of $SiF_4$, while only one-third is exchanged against chlorine from $CCl_4$ under formation of sodium chloride. When the autoclave is depressurized, the first escaping gases contain predominantly the silicon tetrafluoride produced during the reaction, and further the low boiling chlorofluorinated derivatives of methane, which can then be recovered by condensation.

The escaped $SiF_4$ can be reconverted in a simple manner to sodium fluosilicate by first absorbing the gas in water according to the equation:

(2) 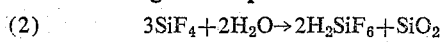 $3SiF_4 + 2H_2O \rightarrow 2H_2SiF_6 + SiO_2$ by which reaction silicic acid is precipitated and an aqueous solution of fluosilicic acid is obtained. After $SiO_2$ has been separated by filtration, difficulty soluble sodium fluosilicate is precipitated from the solution by the addition of sodium chloride, according to the equation:

(3) 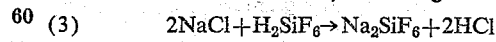 $2NaCl + H_2SiF_6 \rightarrow Na_2SiF_6 + 2HCl$

The resulting sodium fluosilicate can be reacted with a further quantity of carbon tetrachloride, and in this manner, the total amount of fluorine available in the fluosilicate can be used for the halogen exchange, according to the total equation summarizing Equations 1, 2, and 3 as (4) 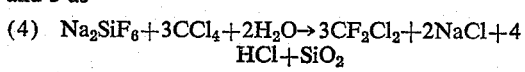 $Na_2SiF_6 + 3CCl_4 + 2H_2O \rightarrow 3CF_2Cl_2 + 2NaCl + 4HCl + SiO_2$ As has been mentioned above, the silicon fluoride which escapes in the waste gases from a superphosphate plant is an important source for the manufacture of sodoium fluosilicate. Therefore, the above Equation 4 may also be expressed on the basis of $SiF_4$ as a starting material, as (4a) $SiF_4 + 2CCl_4 + 2H_2O \rightarrow 2CF_2Cl_2 + 4HCl + SiO_2$ In considering the process of my invention as expressed by Equation 4a, the sodium fluosilicate can be considered as an intermediary compound in the halogen exchange between silicon tetrafluoride and the chlorinated organic compound.

I have further found that, instead of using sodium fluosilicate as the above-mentioned intermediate substance, potassium or barium fluosilicates will also be effective.

The reaction temperature depends on the exchangeability of the halogen atoms in the organic compound. Correspondingly, certain organic compounds can be fluorinated at normal atmospheric pressure, while others require treatment under elevated pressure in an autoclave.

When the halogen exchange takes place between a fluosilicate and an organic halogenated compound containing several exchangeable halogen atoms per molecule, the resulting products are (apart from $SiF_4$) a mixture of monofluoro and difluoro compounds, while trifluoro-compounds are only produced in minor quantities.

The silicon tetrafluoride which is formed during the reaction is absorbed in water and reconverted to fluosilicate eventually, after low-boiling fluorine-containing products have been separated by condensation.

After the reaction is terminated, the reaction mixture contains the sodium, potassium, or barium halide formed during the reaction as well as an unconsumed portion of the initially admixed fluosilicate. By leaching with water, it is possible to separate the easily soluble halide from the residual fluosilicate which is more difficultly soluble in water, and thereby to recover the latter which can be reintroduced into the work cycle.

Furthermore, I have found that it is advantageous to withdraw the newly formed $SiF_4$ continuously from the autoclave, as it is generated in the latter, and via a pressure-resistant condenser, thereby removing $SiF_4$ currently from the reaction space, instead of waiting until the pressure in the autoclave has reached a maximum which would correspond to the full development of $SiF_4$ from the reaction mass, as well as to the evaporated fluorine-containing products of low boiling points. By withdrawing $SiF_4$ continuously prior to attaining maximum pressure in the autoclave, undesirably high pressures are avoided during the process, pressures are on the contrary held below 100 atmospheres, the reaction apparatus is subjected to less wear, and larger amounts of reactants can be processed in a given available reaction space.

In certain cases, where the reaction velocity of the halogen exchange is slow, it has found advisable to accelerate the reaction by the use of a catalyst. Iron powder has been found to be particularly suitable for this purpose.

The invention shall now be illustrated by a number of examples, which are, however, not intended to be limitative in any way.

*Example I*

A steel autoclave of 2 liters capacity and provided with a pressure-resistant water-cooled condenser, is charged with two moles (376 grams) of finely ground sodium fluosilicate and 4 moles (616 grams) of carbon tetrachloride.

The autoclave is connected by way of a tube leading via two condensing traps, one of which is cooled with ice, and the subsequent one with Dry Ice ($CO_2$), to an absorption chamber which is charged with water. A conduit from the latter leads to a further condensing trap and another absorption vessel filled with thoroughly glowed active carbon, both the last-mentioned trap and the carbon-filled absorption vessel being cooled with Dry Ice.

The autoclave is slowly heated and the rise in pressure controlled. At about 270° C. the initiation of the reaction becomes noticeable by an increased rate of pressure rise. The temperature is then held substantially constant. As soon as the pressure in the autoclave has risen to 60 atmospheres above normal, a discharge valve provided at the top of the condenser is opened sufficiently to maintain the pressure in the autoclave constant at this level. The silicon tetrafluoride which is set free during the reaction, is thus removed from the autoclave as it is generated and passes through the condensing traps to be absorbed in the water of the first absorption vessel.

Checks are made from time to time to find out whether a further rise in pressure occurs if the discharge valve is closed. After about 2 to 3 hours, it is found that no further rise in pressure occurs and that the reaction is terminated.

Heating of the autoclave is then interrupted, and the reaction chamber depressurized gradually over a period of about 90 minutes. Toward the end of the depressurizing period, the bulk of the fluorine-containing reaction products condenses in the condensing traps.

After the autoclave has been completely depressurized, it is flushed for about half an hour with air which is injected through a separate valve into the autoclave. In order to collect the remainders of volatile reaction products and unconverted $CCl_4$ from the still warm autoclave, the latter is connected via a number of refrigerated condensing traps with a suction pump. The total amount of condensates retained in the different condensing traps is about 530 g.

The amount of $SiF_4$ absorbed in the water charged absorber is about 200 g. which corresponds to about 96% of the theoretically possible amount. The precipitated silicic acid is separated by filtration and fluosilicic acid is precipitated from the resulting filtrate by adding 1 liter of a sodium chloride solution having a concentration of 300 g./liter NaCl thereto. After filtering the sodium fluosilicate and separating the same from the mother liquor, washing with cold water, and drying about 220 g. sodium fluosilicate are recovered and returned to the work cycle.

The residue in the autoclave is largely soluble in water, and the resulting solution contains about 225 g. of sodium chloride which corresponds to an exchanged amount of 73.1 g. of fluorine, or 32% of the initially introduced amount of 228 g.

The obtained reaction product is freed from small quantities of dissolved $SiF_4$ by washing with a potassium hydroxide solution containing 10% by weight of KOH, and then with water. The product is then dried and subjected to fractionated distillation which yields the following fractions:

250 g. unreacted $CCl_4$
80 g. $CFCl_3$
187 g. $CF_2Cl_2$
5 g. $CF_3Cl$.

About 334 g. or 54% of the initially introduced 616 g. of carbon tetrachloride are converted to chlorofluoro derivatives of methane, having a total fluorine content of 71.5 g., which corresponds to 94.1% of the theoretical amount and to about 31.4% of the initially introduced amount of fluorine, which coincides well with the above determination from recovered NaCl.

*Example II*

The same apparatus as used in Example I is charged with 188 g. (1 mole) of dry sodium fluosilicate and 310 g. carbon tetrachloride (2 moles). The autoclave is then heated gradually up to 280° C. and maintained at this temperature until no further increase in pressure is noted, which is the case after about 2 to 3 hours. The final pressure reached in the autoclave is about 57 to 59 atmospheres excess pressure. Contrary to the mode of operation in Example I, no silicon tetrafluoride is released from the autoclave during the reaction.

When the latter is terminated as indicated by the above final pressure, the autoclave is gradually cooled down to room temperature. Pressure is then still at 14 to 15 atmospheres above normal.

The cooled down autoclave is then de-tensioned by withdrawing the gases therefrom. These are passed through the condensing traps and absorption vessels described in Example I.

The depressurized autoclave is flushed with air and then evacuated by heating.

The amount of fluosilicic acid absorbed in water is determined by quantitative analysis and it is found that 78.2 g. $SiF_4$, or about 75% of the theoretically possible amount, have been absorbed. Correspondingly, a residual amount of 88.0 g. of NaCl is found in the autoclave. The amount of fluorine exchanged in the reaction is thus found to be 28.6 g., which corresponds to about 25% of the initially introduced amount of fluorine, or slightly less (about 4%) than in the preceding example.

The condensed reaction products from the traps are further processed. Their total amount corresponds to a conversion of about 1 mole, or half the initial amount of $CCl_4$, to fluorine-containing products while the other half remains unconverted.

The total fluorine content of the condensate is 28.0 g. of fluorine, which is in conformity with the amount of 28.6 g. calculated on the basis of the recovered NaCl.

The results of fractionated distillation of the combined reaction products of two runs of Example II (4 moles of $CCl_4$) are as follows:

300 g. unreacted $CCl_4$
166 g. $CFCl_3$
64 g. $CF_2Cl_2$
16 g. $CF_3Cl+CF_4$

Comparison with the resulting fractions of Example I shows that the removal of $SiF_4$ in Example I contributes to the formation of larger amounts of the difluorinated methane derivative, while the monofluorinated trichloromethane predominates in Example II.

*Example III*

Example I is repeated except that 560 g. (2 moles) of barium fluosilicate are used instead of sodium fluosilicate. The total amount of fluorine of about 70 g. contained in the resulting chlorofluoro derivatives of methane is in the same order as in the preceding example, so that the yield corresponds to above 90% of the theoretically possible exchange of 76 g. of fluorine.

*Example IV*

Example I is repeated except that 440 g. (2 moles) of potassium fluosilicate are used instead of sodium fluosilicate. The total amount of fluorine introduced into chlorofluoro derivatives of methane is about 45 g., which corresponds to about 19.7% of the amount of fluorine contained in the initial starting materials, i.e., less than in the preceding examples, or about 60% of the theoretically possible amount of 76 g.

*Example V*

A steel autoclave having a capacity of 2 liters is provided with auxiliary devices similar to those of the autoclave described in Example I, in particular, a pressure-resistant water-cooled condenser, and a discharge tube leading through two successively arranged condensing traps, the first of which is cooled with ice while the second is cooled with Dry Ice, to an absorption vessel filled with water.

The autoclave is charged with a mixture consisting of 376 g. (2 moles) of dry finely powdered $Na_2SiF_6$, and 3 moles (711 g.) of hexachloroethane $C_2Cl_6$. The autoclave is gradually heated until, at about 250° C. a rapid rise in pressure becomes distinctly noticeable. The temperature in the autoclave is still raised further to about 280° C. and then held substantially constant at this level. When pressure in the autoclave has reached 35 atmospheres above the prevailing atmospheric pressure, gaseous $SiF_4$ is released at the rate at which it is being formed. The reaction is terminated after about 2 hours. Heating is interrupted, and the autoclave is depressurized during the course of about one hour.

Toward the end of depressurization, the bulk of the liquid reaction products is accumulated in the first, ice-cooled trap. After the autoclave has been completely depressurized, it is flushed for about 30 minutes with air, and the residues remaining in the autoclave are removed by connecting the interior of the autoclave while it is still warm, by means of a cooled condensing tube and an ice-cooled collector to a suction pump.

A total amount of about 500 g. of a liquid reaction product is obtained, the fluorine content of which amounts to 11.6% or about 58 g. This represents 25.3% of the initially introduced fluorine amount and corresponds to about 76.4% of the theoretically transferable amount.

In the water of the absorption vessel, about 156 g. of $SiF_4$, or 75% of the total $SiF_4$ content of the initial fluosilicate charge, have been absorbed. The autoclave residue contains some unreacted hexachloroethane as well as about 175 g. of sodium chloride, which corresponds to an exchanged fluorine amount of 57 g. or about 25% of the initially introduced fluorine.

The above treatment is carried out three times, and the final reaction products, amounting each time to about 500 g., are combined for further treatment to constitute a mass of about 1500 g.

This mass is washed several times (for instance, three times) with an aqueous potassium hydroxide solution containing about 10% of KOH, and with water, then dried with anhydrous calcium chloride, and the dried product subjected to a fractionated distillation, whereby the following fractions are obtained:

433 g. of $CCl_3.CFCl_2$ monofluoro-pentachloroethane
568 g. of $CFCl_2.CFCl_2$ difluorotetrachloroethane
46 g. of $CFCl_2.CF_2Cl$ trifluorotrichloroethane
422 g. of $CCl_2.CCl_2$ tetrachloroethylene.

*Example VI*

The preceding example is repeated with 2 moles of $BaSiF_6$ instead of $Na_2SiF_6$. The amount of exchanged fluorine is about 57 g. or about 75% of the theoretical amount of 76 g. The results are therefore substantially the same as in Example IV.

*Example VII*

Example V is repeated, but with 2 moles of $K_2SiF_6$ instead of the sodium salt. Fluorine transfer amounts to only about 23 g. or about 30% of the theoretically exchangeable amount of 76 g.

*Example VIII*

In a steel autoclave similar to that used in Example V, the reaction of 2 moles of $Na_2SiF_6$ with 477 g. (about 4 moles) of chloroform $CHCl_3$ is carried out in the same manner as in that example.

A total condensate of about 200 g. is obtained which comprises about 80 g. of monofluorodichloromethane $CHFCl_2$ and about 20 g. of difluoromonochloromethane $CHF_2Cl$. The balance consists of unconverted chloroform. The total fluorine content of the reaction products amounts to 21 g., which corresponds to a transfer rate of about 28%.

The absorption water contains about 65 g. (or 31%) of silicon tetrafluoride, which is reconverted to the fluosilicate.

*Example IX*

A reactor having a capacity of about 1 liter is provided with a dropping funnel, a stirrer, and connected to the lower end of a fractionating column filled with glass rings and having a length of 25 cm. and a diameter of 3 cm. The upper end of the column is connected to a descendant (downwardly inclined) condenser, a collector, and an absorption device containing water as the absorption medium.

The reactor is charged with 282 g. (1.5 moles) of dry, finely ground sodium fluosilicate and 195 g. (1 mole) of benzotrichloride, and about 1 g. of iron powder is added to the mixture as a catalyst.

The mixture in the reactor is then heated under stirring to about 214° C. to 220° C., the boiling point of benzotrichloride, and further heating is so regulated that a temperature between 100 and 120° C. prevails at the head end of the fractionating column. During the duration of the reaction, a second mole of benzotrichloride is added dropwise through the dropping funnel. Promptly after the beginning of the reaction, a precipitation of silicic acid becomes noticeable in the water of the absorption vessel due to the decomposition of $SiF_4$ set free during the reaction. After about 10 hours, about 135 g. of $SiF_4$ (86.5% of the theoretically expected amount) will thus have been absorbed in the water. At the same time about 205 g. of a liquid reaction product will have accumulated in the collector. A fractionated distillation of this product yields the following fractions:

101° C. to 102.5° C., benzotrifluoride, $C_6H_5CF_3$, 20 g.
140° C. to 142° C., benzomonochlorodifluoride, $C_6H_5CF_2Cl$, 158 g.
175° C. to 180° C., benzodichloromonofluoride, $C_6H_5CFCl_2$, 10 g.

A higher boiling residue of about 15 g. consists of unreacted benzotrichloride. The different fractions are identfied by their boiling points and quantitatively by their fluorine contents. The total fluorine content of the reaction products is about 46.0 g., which corresponds to an exchange rate of about 81% of the theoretical amount.

*Example X*

The same Example IX is carried out under pressure in an autoclave arrangement as described in Example I and under heating to about 200° C. of the reactants in the autoclave. In this case, the major portion of the reaction product consists of benzotrifluoride. However, the yield corresponds to only about 50% of the the theoretically expected amount, since, under the elevated pressure of 40 atmospheres above normal pressure, a portion of the benzotrichloride cleaves off hydrogen chloride gas and is converted into higher molecular condensed products.

*Example XI*

The same type of apparatus as described in Example V is used for carrying out this example. The reactor is charged with 200 g. of $Na_2SiF_6$ and 268 g. of benzoylchloride $C_6H_5.COCl$, and the mixture is then heated, without the use of a catalyst, to the boiling point of benzoylchloride at about 197° to 198° C., and heating is then continued at such a rate that the temperature at the head of the adsorption column does not exceed 160° C. During the treatment, a further batch of about 150 g. of benzoylchloride is introduced dropwise into the reactor. After about 12 hours, the water in the absorption vessel has absorbed about 104 g. of silicon tetrafluoride (90.4% of the theoretically expected amount), and a distillate amounting to about 260 g. has been accumulated in the collector.

Distillation of the resulting reaction product from the column yields 235 g. of a pure benzoyl fluoride having a boiling point of 159° C. The residue consists of unconverted benzoyl chloride.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What I claim is:

1. A process for producing fluorine-containing organic compounds in which the fluorine atoms are present in groups containing a single aliphatically bonded carbon atom comprising the steps of mixing a chlorine-containing organic compound free from fluorine and containing at least one functional group containing a single central aliphatically bonded carbon atom and at least one chlorine atom bonded to said carbon atom in said functional group radical with a fluosilicate salt selected from the group consisting of sodium, potassium and barium fluosilicate; heating the mixture to a temperature between about 190° and 300° C. so as to entertain the reaction between the aforesaid components thereof, and effecting an exchange of chlorine against fluorine in said chlorine-containing compound, and separating the resulting fluorinated organic reaction products from the developed silicon tetrafluoride and other by-products.

2. A process for producing fluorine-containing organic compounds in which the fluorine atoms are present in groups containing a single aliphatically bonded carbon atom comprising the steps of mixing a chlorine-containing organic compound free from fluorine and containing at least one functional group containing a single central aliphatically bonded carbon atom and at least one chlorine atom bonded to said carbon atom in said functional group radical with a fluosilicate salt selected from the group consisting of sodium, potassium and barium fluosilicate; heating the mixture to a temperature between about 190° and 300° C. so as to entertain the reaction between the aforesaid components thereof, and effecting an exchange of chlorine against fluorine in said chlorine-containing compound, and separating the resulting fluorinated organic reaction products from the developed silicon tetrafluoride and other by-products; reconverting the silicon tetrafluoride to the fluosilicate salt, and returning the latter to the first step of the process.

3. The process as described in claim 1, characterized in that the reaction is carried out at a pressure ranging from normal to about 100 atmospheres normal depending on the exchangeability of the chlorine atoms for fluorine atoms in said chlorine-containing compound.

4. The process described in claim 1 characterized in that a catalytically active small amount of iron powder is added to the mixture, thereby accelerating the exchange of fluorine for chlorine in the chlorine-containing compound.

5. The process as described in claim 1, characterized in that the silicon tetrafluoride formed during the reaction is continuously withdrawn from the reaction mass, thereby maintaining pressure above the latter below the theoretical maximum.

6. A process for producing organic fluoro-compounds comprising the steps of mixing a chlorine-containing organic compound free from fluorine and selected from the group consisting of chlorinated methanes, chlorinated ethanes, benzochlorides, and acyl chlorides with a fluosilicate salt selected from the group consisting of sodium, potassium and barium fluosilicate; heating the resulting mixture to a temperature between about 190° and 300° C. so as to entertain the reaction between the aforesaid components thereof, and effecting an exchange of chlorine against fluorine in said chlorine-containing compound, and separating the resulting fluorinated organic reaction products from the developed silicon tetrafluoride and other by-products.

7. A process as described in claim 6, characterized in that said chlorine-containing organic compound is carbon tetrachloride.

8. A process as described in claim 6, characterized in that said chlorine-containing organic compound is hexachloroethane.

9. A process as described in claim 6, characterized in that said chlorine-containing organic compound is chloroform.

10. A process as described in claim 6, characterized in that said chlorine-containing organic compound is benzotrichloride.

11. A process as described in claim 6, characterized in that said chlorine-containing organic compound is benzoylchloride.

References Cited in the file of this patent

UNITED STATES PATENTS

| | | |
|---|---|---|
| 2,673,884 | Thomas | Mar. 30, 1954 |
| 2,842,603 | Miller | July 8, 1958 |

OTHER REFERENCES

Paterno et al.: Atti Acad. Lincei, 16(2), 160–166, 1907.